United States Patent [19]

Slaugh

[11] 4,295,999
[45] Oct. 20, 1981

[54] POLYMERIZATION CATALYST

[75] Inventor: Lynn H. Slaugh, Houston, Tex.

[73] Assignee: Shell Oil Company, Houston, Tex.

[21] Appl. No.: 152,209

[22] Filed: May 21, 1980

Related U.S. Application Data

[62] Division of Ser. No. 86,013, Oct. 17, 1979, Pat. No. 4,239,872.

[51] Int. Cl.³ .................. B01J 23/20; B01J 23/24; B01J 21/00
[52] U.S. Cl. .................. 252/455 R; 252/456; 252/458; 252/463; 252/464; 252/465
[58] Field of Search .......... 252/458, 465, 464, 455 R, 252/456

[56] References Cited

U.S. PATENT DOCUMENTS

| | | | |
|---|---|---|---|
| 2,731,452 | 1/1956 | Field et al. | 252/458 X |
| 2,912,419 | 11/1959 | Peters et al. | 252/464 X |
| 3,415,759 | 12/1968 | Johnson | 252/458 X |
| 3,526,601 | 9/1970 | Fotis, Jr. et al. | 252/465 X |
| 3,780,011 | 12/1973 | Pullukat et al. | 252/458 X |
| 3,897,364 | 7/1975 | Colombo et al. | 252/429 C |

*Primary Examiner*—Carl F. Dees

[57] ABSTRACT

Polymerization catalysts are prepared by impregnation of a silica or aluminum support with a vanadium, titanium and/or chromium salt decomposable upon calcination to the oxide, calcining the impregnated support at about 500°–700° C., impregnating the calcined support with a solution of aluminum hydride and heating the resultant material to about 300° C.–500° C. in hydrogen. The catalyst is extremely active for the polymerization of lower molecule weight olefins such as ethylene and ethylene-propylene mixtures.

16 Claims, No Drawings

POLYMERIZATION CATALYST

This is a division, of application Ser. No. 086,013, filed Oct. 17, 1979 now U.S. Pat. No. 4,239,872.

FIELD OF THE INVENTION

This invention relates to a process for polymerizing lower molecular weight olefins by contact with novel supported titanium, vanadium and/or chromium catalysts.

BACKGROUND OF THE INVENTION

Aluminum hydride has been used to deposit a layer of aluminum metal on a silica or aluminum support which is subsequently reacted with a transition metal halide. See U.S. Pat. No. 3,897,364 issued July 29, 1975. The instant invention does not utilize metallic aluminum, nor halides of transition metals.

Aluminum hydrides have further been utilized in conjunction with supported transition metal oxides as in, for example, U.S. Pat. No. 2,912,419 issued Nov. 10, 1959 and U.S. Pat. No. 3,526,601 issued Sept. 1, 1970. In these cases, the aluminum hydride was not reacted with the supported transition metal oxides as in the instant invention, but serve as cocatalysts, frequently added to the reaction mixture separately from the supported catalyst.

SUMMARY OF THE INVENTION

The instant invention provides a process for polymerizing low molecular weight olefins having carbon numbers from two to about four, particularly ethylene and ethylene admixed with higher olefins such as propylene or 1-butene which comprises contacting the olefin feed stock with a novel catalyst prepared by impregnating a silica or alumina support with a vanadium, titanium and/or chromium salt decomposable upon calcination to the oxide, calcining the impregnated support at about 500° C. to about 700° C., impregnating the calcined support with a solution of aluminum hydride and heating the resultant material to between about 300° C. to about 500° C. in hydrogen. There are several advantages to the catalyst used in the instant invention. The catalyst is halogen-free and is utilized in the heterogeneous mode. The catalyst provides a high activity, resulting in a polymer with a low ash content, and the process may be operated in either a gaseous or solvent mode. Because the aluminum hydride is actually reacted with the transition metal-containing support, the use of the two catalyst systems of the prior art is avoided.

DESCRIPTION OF THE PREFERRED EMBODIMENTS

The conditions for polymerization of olefins with the catalysts are those that are typical for catalysts containing transition metals. The conditions are well known in the art and need not be set forth herein in detail. Suitable temperatures will range from about 0° C. to about 200° C. Lower temperatures will require more lengthy reaction times. Pressures will range upwardly from atmospheric to any desired maximum pressures, for example 15,000, 30,000 psig or even higher pressures. Suitably pressures will be between about 200 and about 5000 psig, or about 500 to about 1500 psig.

The catalysts of this invention are particularly suited for the polymerization of lower molecular weight olefins and mixtures of lower molecular weight olefins. Particularly desirable are olefins with carbon numbers from 2 to about 4. Preferred feedstocks are ethylene, ethylene admixed with propylene and ethylene admixed with 1-butene.

The polymerization of olefins by means of these catalysts can be carried out in the presence or absence of a solvent. Solvent reaction media for polymerization include various hydrocarbons, e.g. aliphatic hydrocarbons such as n-pentane, n-hexane, n-heptane, cyclohexane or aromatic hydrocarbons such as benzene, toluene or xylenes. In the absence of solvent the polymerization takes place in the gaseous phase.

The preparation of the catalyst of this invention comprises four basic steps: (1) impregnating a silica or alumina support with a decomposable vanadium, titanium or chromium salt, (2) calcining the impregnated support, (3) impregnating the calcined support with aluminum hydride and (4) heating the resulting support in hydrogen at 300° C.–500° C.

The aluminas used to prepare the catalysts of this invention are primarily gamma aluminas. These materials are readily available commercially and are frequently used as catalysts and catalyst supports. The term "gamma alumina" as used herein refers to the intermediate forms of alumina encountered during the thermal decomposition of the hydrated aluminas and sometimes during that of other aluminum compounds before the appearance of alpha alumina, which constitutes the stable phase above 1100° C. The gamma alumina may contain minor proportions of other materials without departing from the scope of the invention such as, for example, silica and carbon. The aluminas used herein are also referred to in the trade as "activated" alumina. They are prepared by heating or activating alumina gels to elevated temperatures and are found to contain amounts of chemically bound water depending on the temperature of activation. Surface areas generally range from about 50 to about 400 square meters per grain. Particularly desirable supports obtainable commercially are Kaiser 201 $Al_2O_3$, Norton $Al_2O_3$ and Condea Chemie PURAL $Al_2O_3$.

The porous silicas used in the preparation of the instant catalyst are readily available commercially and are known as silica gels which are essentially substantially dehydrated amorphorous silica. These materials are available in various density grades, from low density with surface areas ranging from about 100–200 $m^2/g$, to regular density with surface areas up to about 800 $M^2/g$. These commercially available materials are used as desiccants, selective adsorbents, catalysts and catalyst supports. The porous silica may contain minor proportions of other materials without departing from the scope of the invention such as, for example, alumina and carbon. A particularly suitable silica support is Davison Grade 57 made by Davison.

The first step in the preparation of the catalyst is to impregnate the support with a salt(s) of vanadium, titanium and/or chromium which is decomposable upon calcination to the oxide. The salts must be soluble in a suitable solubilizing media, either organic or inorganic. An aqueous medium, especially an acidized aqueous medium is particularly suitable. Suitable metal salts, exemplary of those useful in the practice of the invention are meta-vanadic acid, tetra-vanadic acid, ammonium vanadate, vanadium oxide, vanadium oxybromide, vanadium bromide, vanadium acetylacetonate, titanium oxyacetylacetonate, titanium oxide, titanium isopropoxide, titanium oxalate, ammonium titanium oxalate, chromium acetate, chromium hydroxide, chromium nitrate, chromium oxalate, chromium dioxide, chromium trioxide, chromium acetylacetonate, chromium tartrate, ammonium chromate, ammonium dichromate, chromocene, chromium vanadate, chromium titanate and the like.

The impregnated support is then dried of solvent and calcined in order to convert the metal salts to oxides. Calcining may be carried out in any atmosphere, vacuum, reducing, neutral or oxidizing. When the anionic portion of the metal salt is organic, it is preferred to calcine in neutral or oxidizing atmosphere to keep from depositing carbonaceous material on the support. Air is a preferred atmosphere for these materials. The drying step is preferably carried out in the initial stages of the calcining step. Drying and calcining times are not critical and depend on temperatures. They are readily determined by simple experimentation. Five minutes to ten hours are usually sufficient although longer times are acceptable. The calcining usually takes place at temperatures ranging from about 450° C. to about 1000° C., preferably from about 500° to about 950° C. A temperature of about 600° C.-700° C. is generally suitable. Suitable reducing atmospheres are hydrogen. Suitable neutral atmospheres are nitrogen, argon, helium and the like. Suitable oxidizing atmospheres are air and oxygen. Air is a preferred atmosphere. After using an oxidizing atmosphere, the calcined material should be flushed with a non-oxidizing atmosphere such as nitrogen.

The amount of transition metal oxide to support is not critical and may be varied through a wide range so long as each component is present in sufficient amount to be catalytically effective, a condition which is readily determined by experiment. The support will contain from about 0.1 to about 20, and preferably from about 0.5 to about 5 percent by weight of the transition metal oxide, measured as the metal per total weight of the catalyst.

After calcination the support is swept in a dry, non-oxygen containing atmosphere, cooled and impregnated with aluminum hydride. Since aluminum hydride reacts with water and oxygen it is important to keep the support impregnating solution free from water and oxygen.

The aluminum hydride suitable for use in this invention is prepared commercially by reacting at room temperature lithium aluminum hydride and aluminum chloride in diethyl ether ($Et_2O$). The product is isolated in high yield by decanting and drying at room temperature. The product is analyzed as $AlH_3 \cdot \frac{1}{3}Et_2O$. For purposes of this invention the aluminum hydride is dissolved in a suitable organic solvent. The prime requirement on the solvent is that it be substantially anhydrous, non-hydroxyl containing and oxygen-free—water, alcohol and oxygen reacting with aluminum hydride. Suitable solvents are for example, ethers, such as diethyl ether, tetrahydrofuran, pyridine, benzene, toluene and the like.

To prepare the compositions of the instant invention, the porous, calcined support is contacted with a solution of aluminum hydride in appropriate proportions as to provide the desired amount of aluminum hydride per unit weight of silica. A suitable method of impregnation is described in U.S. Pat. No. 3,146,209, issued Aug. 25, 1964, incorporated by reference. The impregnated support is then dried of solvent and then heated (activated) in a hydrogen atmosphere at temperatures from about 200° C. to about 600° C., preferably from about 250° C. to about 550° C. and more preferably 300° C. to about 500° C. The drying step is preferably carried out in the initial stages of the heating step. Drying and heating times are not critical and depend upon temperatures. They are readily determined by simple experimentation. Five minutes to one hour are usually sufficient although longer times, say up to ten hours or longer are acceptable. Typically the amount of aluminum hydride (measured as aluminum metal) added will range from about 0.1 to about 25 and more preferably from about 1 to about 10 percent by weight of the total composition. Compositions containing around 7-8 percent by weight are particularly suitable. After activation, the catalyst material must be kept dry and oxygen-free in order to maintain its high activity.

The critical aspect of this step is the heating in hydrogen. Activation in other gases such as nitrogen, argon, carbon monoxide, methane, etc. produce a catalyst with poorer activity. The hydrogen should be substantially free of hydrocarbon materials, although minor amounts of neutral gases such as nitrogen and argon may be present. Activators other than aluminum hydride produce catalysts with poorer activity. Particularly surprising is the ineffectiveness of aluminum alkyl compared to aluminum hydride for activation. Triethylaluminum, diethyl aluminum chloride, diethyl aluminum hydride, trioctylaluminum, and diisobutyl aluminum hydride, for example, are inferior to aluminum hydride for activating the catalyst. Analysis of the catalyst material after activating in hydrogen indicates that no aluminum metal has been deposited on the support and that substantially no residual aluminum hydride remains. Apparently the aluminum hydride reacts in some unknown manner with the support and/or transition metal oxide to enhance activity.

The preparation of the compositions of this invention and their utilization as catalysts will be further described by the examples below which are provided for illustration and are not to be construed as limiting the invention. The following abbreviations are used for convenience in the examples: "acac" for acetylacetonate and "$Et_2O$" for diethyl ether. A steam-heated 300-milliliter stainless-steel magnadrive autoclave was employed for the polymerization reactions. The ethylene and solvents were purified over molecular sieves and BASF reduced copper catalyst.

EXAMPLE 1

The supports used in this illustrative embodiment are shown below.

| Support | Surface Area, $m^2/g$ | Pore Vol, cc/g | Particle Size |
|---|---|---|---|
| Davison Grade 952 $SiO_2$ | 300 | 1.65 | 70 mesh (average) |
| Davison Grade 57 $SiO_2$ | 300 | 1.0 | less than 100 mesh |
| PURAL SB $Al_2O_3$ | 250 | 0.55 | 20–90 microns |

The Davison material is manufactured by Davison Chemical Div., W. R. Grace & Co. and the PURAL material is manufactured by Condea Chemi. These supports were calcined at 500° C. for 2 hours before use.

Part A: Titanium/silica Catalyst

5 Grams of titanylacetonate was mixed with 5 ml of nitric acid (70% wt aqueous $HNO_2$) followed by the addition of 25 ml of distilled water in 5 ml portions while stirring. The resulting solution was used to impregnate 12 g of the Davison Grade 57 silica gel. The impregnated catalyst was placed in a 25 mm O.D. Vycor tube. The tube was set in an electric furnace and heated in 100° C. increments from 100° C. to 600° C. with a 200 ml/min downflow of air. The time at each temperature was about 0.5 hours. The downflow was then switched from air to nitrogen and heated to 700° C. for 0.25 hours. The material was then cooling in nitrogen and transferred to a dry box.

0.25 Grams of aluminum hydride etherate ($AlH_3 \cdot \frac{1}{3}Et_2O$) were dissolved in 4 ml of tetrahydrofuran. The resulting solution was used to impregnate 1.5 g of the above-prepared titanium on silica material. This impregnated material was loaded back into the Vycor tube. The tube was removed from the dry box, set in an electric furnace and an upflow of purified hydrogen at 175 ml/min was passed through the material. The catalyst was activated by running at room temperature, 40° C., 100° C., 200° C., 300° C. and 400° C. for 20 minutes each. The tube was cooled and returned to the dry box. Careful attention was given to the catalyst after addition of the aluminum hydride etherate to exclude any oxygen or moisture.

Analysis of the resulting catalyst showed it to contain about 4.7% titanium oxide (basis metal per total catalyst) and 7.7% of aluminum added via $AlH_3$ (basis metal per total catalyst).

Part B: Titanium/alumina Catalyst

A titanium/alumina catalyst was prepared as described above in Part A, but using 30 g of PURAL SB $Al_2O_3$ instead of the Davison 57 silica and 2.0 g of titanylacetylacetonate in 5 ml of nitric acid and 30 ml of water. Analysis of the resulting catalyst showed it to contain about 1.4% titanium and 7.4% added aluminum, measured of weight percent of metal per total weight of catalyst.

Part C: Titanium-chromium/silica Catalyst

One gram of titanylacetylacetonate was mixed with 3 ml of 70% wt aqueous nitric acid and dissolved by the addition of 7 ml of distilled water. This solution was combined with 0.72 g of chromium nitrate in 4 ml of distilled water and the resulting solution was used to impregnate 7.5 g of Davison 57 silica gel. This material was calcined, impregnated with aluminum hydride etherate and activated in hydrogen as per the procedure described in part A above. Analysis of the resulting catalyst showed it to contain 2.2% titanium, 1.2% chromium and 7.7% added aluminum, all measured as weight percent of metal per total weight of catalyst.

Part D: Vanadium/silica Catalyst 0.5 Grams of vanadyl acetylacetonate was mixed with 2 ml of 70% wt aqueous nitric acid and diluted with 7 ml of distilled water. The resulting solution was used to impregnate 5 g of Davison 57 silica gel. This material was calcined, impregnated with aluminum hydride etherate and activated in hydrogen as per the procedure described in part A above. Analysis of the resulting catalyst showed it to contain 1.6% vanadium and 7.4% added aluminum, all measured as weight percent of metal per total weight of catalyst.

Part E: Chromium/silica Catalyst 0.36 Grams of chromium nitrate was dissolved in 20 ml of distilled water and used to impregnate 7.5 g of Davison 952 silica gel. This material was calcined, impregnated with aluminum hydride etherate and activated in hydrogen as per the procedure in Part A above. Analysis of the resulting catalyst showed it to contain 0.7% chromium and 7.4% added aluminum, all measured as weight percent of metal per total weight of catalyst.

EXAMPLE 2

A series of experiments were run to show the effect of hydrogen activation temperature on catalyst activity. The catalyst was prepared by impregnating PURAL SB $Al_2O_3$ (CONDEA, 20-90 microns) with $TiO(acac)_2$ dissolved in $HNO_3$, calcining in air at 550° C., and then flushing with $N_2$ at 700° C. The resultant material was impregnated with $AlH_3 \cdot \frac{1}{3}Et_2O$. The resultant catalyst contained about 0.72 weight percent of titanium (measured as the metal) and about 3.8 weight percent of aluminum (measured as the metal) added using $AlH_3$. 0.5 Grams of catalyst and 100 ml of cyclohexane solvent were charged to the autoclave. Ethylene was pressured to this autoclave at pressures up to 1000 psig. After specified reaction times, the autoclave was cooled and the polymer product was separated from the solvent and analyzed. The results are shown in Table I.

TABLE I

Effect of Hydrogen Activation Temperature

| Experiment | $H_2$ Activation °C. | Reaction Temp. °C.[b] | Ethylene Pressure psig[c] |
|---|---|---|---|
| 1 | 25[a] | 100 | 1000 |
| 2 | 100 | 100 | 980-950 |
| 3 | 200 | 100 | 1000-800 |
| 4 | 300 | 100-135[c] | 1000-650 |
| 5 | 400 | 87-137[c] | 1000-600 |
| 6 | 500 | 100-129[c] | 1000-820 |
| 7 | 600 | 100-108[c] | 950-730 |
| 8 | 700 | 100 | 1000-980 |

| Experiment | Reaction Time Hrs. | Polymer Wt. g | M.P. Max. °C. |
|---|---|---|---|
| 1 | 0.5 | 1.1 | — |
| 2 | 0.5 | 1.1 | — |
| 3 | 0.5 | 9.2 | — |
| 4 | 0.5 | 19.3 | 137 |
| 5 | 0.25 | 25.0 | 138 |
| 6 | 0.25 | 18.7 | 135 |
| 7 | 0.5 | 12.1 | 139 |
| 8 | 0.5 | 2.0 | — |

[a]Not treated with $H_2$ but kept under an inert atmosphere ($N_2$).
[b]Autoclave steam heated - in some cases the heat of reaction caused a temperature rise.
[c]Includes vapor pressure of cyclohexane solvent.

EXAMPLE 3

A series of experiments were run to show the effect of activation of different gases. The catalyst was prepared as in example 2. The activation temperature was 400° C. One gram of catalyst and 100 ml of cyclohexane solvent were charged to the autoclave. Ethylene was pressured to the autoclave at pressures up to about 1000 psi. After specified reaction times, the autoclave was cooled and the resultant polymer was separated from the solvent and analyzed. The results are shown in Table II.

TABLE II

Effect of Gas Used for Activation of $Al_2O_3$ - Supported Catalyst

| Experiment | Gas Used for Activation | Reaction Temp. °C.[a] | Ethylene Pressure psig[b] |
|---|---|---|---|

TABLE II-continued

| | | | |
|---|---|---|---|
| 9 | $H_2$ | 87–137 | 1000–600 |
| 10 | $N_2$ | 101–103 | 900–880 |
| 11 | $N_2$ | 101–108 | 920–1000 |
| 12 | Ar | 99–102 | 1000–1020 |
| 13 | CO | 103 | 970–830 |
| 14 | $CH_4$ | 101–105 | 1000–970 |

| | Reaction | Polymer | |
|---|---|---|---|
| Experiment | Time Hrs. | Wt. g | M.P. Max. °C |
| 9 | 0.25 | 25.0 | 138 |
| 10 | 0.5 | 2.7 | — |
| 11 | 0.5 | 6.7 | — |
| 12 | 0.5 | 1.8 | — |
| 13 | 0.5 | 1.2 | — |
| 14 | 0.5 | 3.3 | — |

[a] Autoclave steam heated-in some cases the heat of reaction caused a temperature rise.
[b] Includes vapor pressure of cyclohexane solvent.

A catalyst was prepared by impregnating Davison 57 $SiO_2$ with $TiO(acac)_2$ dissolved in $HNO_3$, calcining in air at 550° C., and then flushing with $N_2$ at 700° C. The resultant material was impregnated with $AlH_3 \cdot \frac{1}{3}Et_2O$. The resultant catalyst contained about 3 weight percent Ti (measured as the metal) and about 7.7 weight percent aluminum (measured as the metal) added using $AlH_3$. The activation temperature was 400° C. 0.2 Grams of catalyst and 100 ml of pentane solvent were charged to the autoclave. Ethylene was pressured into the autoclave at 250–500 psig (includes vapor pressure of n-pentane). The results are shown in Table III.

TABLE III

Effect of Gas Used for Activation of $SiO_2$ - Supported Catalyst

| Experiment | Gas Used for Activation | Temperature[a] (°C.) | Polymer Produced in 0.5 hrs. g. |
|---|---|---|---|
| 15 | $H_2$ | 97–122 | 25 |
| 16 | $N_2$ | 100–104 | 7.4 |

EXAMPLE 4

A series of experiments were run to compare the effect of using various alkyl aluminums in place of aluminum hydride in the catalyst preparation. The catalyst was prepared by impregnating PURAL SB $Al_2O_3$ (CONDEA, 20–90 microns) with $TiO(acac)_2$ dissolved in $HNO_3$, calcining in air at 550° C. and then flushing with $N_2$ at 700° C. The resultant material was impregnated with either $AlH_3 \cdot \frac{1}{3}Et_2O$ or the designated alkyl aluminum compound dissolved in tetrahydrofuran and activated in hydrogen at the designated temperature. The resultant catalyst contained about 0.7–0.8% weight of titanium (measured as the metal) and about 3.9% weight of aluminum (measured as the metal) added using the $AlH_3$ or alkyl aluminum. 0.5 Grams of catalyst, 100 ml of cyclohexane solvent were charged to the autoclave and ethylene was pressured to the autoclave. The results are shown in Table IV.

TABLE IV

Comparison of $AlH_3$ with Alkyl Aluminum Compounds

| Experiment | Aluminum Compound | $H_2$ Activation Temp., °C. | Reaction Temp., °C.[a] | Ethylene Pressure psig[b] |
|---|---|---|---|---|
| 17 | $AlH_3$ | 400 | 87–137 | 1000–600 |
| 18 | $i-Bu_2AlH$ | 400 | 100–108 | 940–880 |
| 19 | $Et_2AlH$ | 300 | 100–107 | 980–760 |
| 20 | $Et_2AlH$ | 400 | 97 | 960–940 |
| 21 | $Et_2AlCl$ | 400 | 98–100 | 940–900 |
| 22 | $Et_3Al$ | 400 | 97 | 970–930 |

| | Reaction | Polymer | |
|---|---|---|---|
| Experiment | Time Hrs. | Wt. g | M.P. Max. °C. |
| 17 | 0.25 | 25 | 138 |
| 18 | 0.5 | 6.2 | — |
| 19 | 0.5 | 11.1 | 141 |
| 20 | 0.5 | 5 | — |
| 21 | 0.5 | 4.7 | — |
| 22 | 0.5 | 0.4 | — |

[a] Autoclave steam heated in some cases the heat of reaction caused a temperature rise.
[b] Includes vapor pressure of cyclohexane solvent.

EXAMPLE 5

Catalysts containing various amounts of transition metal oxide and aluminum hydride were prepared by impregnating Davison Grade 952 $SiO_2$ with $TiO(acac)_2$ or $TiO(acac)+Cr(NO_3)_2$ dissolved in $HNO_3$, calcining in air at 550° C. and flushing with $N_2$ at 700° C. The resultant material was impregnated with $AlH_3 \cdot \frac{1}{3}Et_2O$ dissolved in tetrahydrofuran. The catalysts were activated at 400° C. in hydrogen. The catalyst composition is shown in Table V. 0.2 Grams of catalyst and 100 ml of n-pentane solvent were charged to the autoclave and ethylene was pressured to the autoclave at 400–500 psig (includes vapor pressure of the solvent). The results are shown in Table V below.

TABLE V

| | Catalyst | | | | | |
|---|---|---|---|---|---|---|
| Experiment | % wt Al from $AlH_3$ | % wt Ti | % wt Cr | Temp. °C.[a] | Reaction Time, hrs. | Polymer Produced, g |
| 23 | 9.1 | 1.2 | 0 | 102 | 1 | 4.9 |
| 24 | 7.7 | 1.2 | 0 | 103 | 1 | 9.8 |
| 25 | 6.3 | 1.2 | 0 | 103 | 1 | 1.8 |
| 26 | 9.1 | 1.2 | 0.5 | 105 | 1 | 48 |
| 27 | 7.7 | 1.2 | 0.5 | 110–125 | 1 | 53.4 |
| 28 | 7.7 | 1.2 | 0.5 | 111–140 | 0.5 | 39.8 |
| 29 | 6.3 | 1.2 | 0.5 | 107–112 | 1 | 49 |
| 30 | 4.8 | 1.2 | 0.5 | 104–107 | 1 | 34.5 |
| 31 | 3.2 | 1.2 | 0.5 | 103 | 1 | 5.5 |

[a] Autoclave steam heated - in some cases the heat of reaction caused a temperature rise.

EXAMPLE 6

Catalysts containing various amounts of transition metal oxide and aluminum hydride were prepared by impregnating Davison Grade 57 $SiO_2$ with $TiO(acac)_2$ or $TiO(acac)_2+Cr(NO_3)_3$ dissolved in $HNO_3$, calcining in air at 550° C. and flushing with $N_2$ at 700° C. The resultant material was impregnated with $AlH_3 \cdot \frac{1}{3}Et_2O$ dissolved in tetrahydrofuran. The catalysts were activated at 400° C. in hydrogen. The catalyst compositions are shown in Table VI. 100 Milliliters of n-pentane were used as solvent. Ethylene was pressured to the reactor at 300–500 psig (including vapor pressure of pentane). The results are shown in Table VI.

TABLE VI

| Experiment | Catalyst[a] % wt Al from AlH₃ | % wt Ti | % wt Cr | Temp. °C.[b] | Reaction Time, hrs. | Polymer Produced, g |
|---|---|---|---|---|---|---|
| 32[c] | 16.7 | 0.8 | 0 | 95–105 | 2 | 3.2 |
| 33[c] | 10.7 | 0.8 | 0 | 95–105 | 2 | 9.9 |
| 34[c] | 7.4 | 0.8 | 0 | 95–105 | 2 | 21.8 |
| 35[c] | 5.7 | 0.8 | 0 | 95–105 | 2 | 12.1 |
| 36 | 6.8 | 1.2 | 0.5 | 107–111 | 1 | 21.1 |
| 37 | 7.7 | 1.2 | 0.5 | 102–107 | 1 | 36.4 |
| 38 | 8.5 | 1.2 | 0.5 | 102–104 | 1 | 16.0 |
| 39 | 3.2 | 1.8 | 0.9 | 98–101 | 1 | 0.1 |
| 40 | 4.8 | 1.8 | 0.9 | 98–103 | 1 | 18.6 |
| 41 | 6.3 | 1.8 | 0.9 | 103–112 | 1 | 30.3 |
| 42 | 7.7 | 1.8 | 0.9 | 105–114 | 1 | 23.5 |
| 43 | 9.1 | 1.8 | 0.9 | 101–103 | 1 | 26.2 |
| 44 | 11.0 | 1.8 | 0.9 | 98–102 | 1 | 9.4 |
| 45 | 3.2 | 2.4 | 1.2 | 98–101 | 1 | 1.7 |
| 46 | 4.8 | 2.4 | 1.2 | 100–106 | 1 | 18.5 |
| 47 | 6.3 | 2.4 | 1.2 | 102–114 | 1 | 44.5 |
| 48 | 7.7 | 2.4 | 1.2 | 104–108 | 1 | 29.2 |
| 49 | 11.0 | 2.4 | 1.2 | 103–120 | 1 | 30.3 |
| 50 | 2.3 | 2.4 | 1.2 | 100–103 | 1 | 19.8 |

[a]For Experiment 32–35, 0.2 g of catalyst was charged to the autoclave. For all other experiments, 0.1 g of catalyst was charged.
[b]Autoclave steam heated - in some cases the heat of reaction caused a temperature rise.
[c]Includes 100 psig initial hydrogen pressure.

EXAMPLE 7

A series of catalysts containing various transition metal oxides was prepared similar to methods disclosed above. Davison Grade 57 SiO₂ was used as the support which was impregnated with the appropriate solution of the metal compound (ZrO(NO₃)₂, Ni(NO₃)₂, Er(NO₃)₃, Sc(NO₃)₃, Mn(NO₃)₂, Cr(NO₃)₃ in water and TiO(acac)₂, VO(acac)₂ and Cr(NO₃)₃ in HNO₃) and briefly calcined in air at 550° C. and subsequently flushed with N₂ at 700° C. The resultant material was impregnated with AlH₃.⅓Et₂O in tetrahydrofuran. The final catalyst was activated in hydrogen at 400° C. The Zr(OPri)₄ was impregnated as a pentane solution and only heated to 100° C. in N₂ before AlH₃.⅓Et₂O was added. The final catalysts contained about 7.8% weight of aluminum (measured as the metal) supplied by the aluminium hydride. The concentrations of the other metal oxides (measured as the metal) are shown in Table VII. 100 Milliliters of n-pentane were used as solvent. Ethylene was pressured into the autoclave at 350–500 psig (includes vapor pressure of pentane). The reaction temperature ranged from about 100°–112° C. The results are shown in Table VII.

TABLE VII

| Experiment | Metal % wt | Catalyst amt., g | Time, hrs. | Polymer obtained, g |
|---|---|---|---|---|
| 51 | Ti 1.8, Cr 0.5 | 0.1 | 1 | 24 |
| 52 | V 1.8 | 0.1 | 1 | 24 |
| 53 | V 1.8, Cr 0.5 | 0.1 | 1 | 19.7 |
| 54 | V 1.8, Cr 0.75 | 0.1 | 6 | 46.4 |
| 55 | Cr 1.0 | 0.2 | 2 | 12.1 |
| 56 | Zr 1.8 | 0.2 | 2 | 2.8 |
| 57 | Zr 2 (9.1% Al) | 0.2 | 0.5 | 3.9 |
| 58 | Zr 2 (from Zr(OPri)₄) | 0.2 | 0.5 | 4.7 |
| 59 | Zr 1.8, Cr 0.8 | 0.2 | 0.5 | 4.5 |
| 60 | Ni 1.8 | 0.2 | 0.5 | 0.2 |
| 61 | Ni 1.5 | 0.2 | 0.5 | 0.2 |
| 62 | Er 2 | 0.2 | 0.5 | 0.2 |
| 63 | Sc 2 | 0.2 | 0.5 | 0.2 |
| 64 | Mn 2 | 0.2 | 0.5 | 0.2 |

EXAMPLE 8

A catalyst was prepared similar to Example 1, part C above and contained about 1.88% wt titanium, 0.75% wt chromium and 7.7% wt added aluminum. 1.5 Grams of catalyst, 100 ml of pentane solvent and 25 g of purified propylene were charged to the autoclave. Ethylene was pressured to the autoclave at 350–550 psig and the autoclave was heated to a reaction temperature of about 47° C.–65° C. After a reaction time of 5.5 hours, the autoclave was cooled and the resultant copolymer was separated from the solvent. 51.4 Grams of copolymer were recovered.

EXAMPLE 9

A catalyst was prepared similar to Example 1, part C above and contained about 3.19% wt titanium, 1.46% wt chromium and 6.2% wt added aluminum. 1.5 Grams of catalyst, 100 ml of pentane solvent and 16 g of butene-1 were charged to the autoclave. Ethylene was pressured to the autoclave at 500 psig and the autoclave was heated to a reaction temperature of about 98° C.–107° C. After a reaction time of 1 hour, the autoclave was cooled and the resultant copolymer was separated from the solvent. 27.5 Gram of copolymer were recovered. Repeating the above with a catalyst containing about 3.19% wt titanium, 1.46% wt chromium and 7.7% wt added aluminum resulted in 35.9 grams of copolymer being produced.

I claim:

1. A process for the preparation of a catalyst suitable for polymerization reactions which process comprises:
   (a) impregnating a silica or alumina support with a transition metal salt decomposable upon calcination to the oxide wherein said metal salt is selected from the group consisting of vanadium, titanium, chromium or mixtures thereof;
   (b) calcining the metal impregnated support at a temperature ranging from about 450° C. to about 1000° C.;
   (c) impregnating the calcined support with a solution of aluminum hydride; and (d) heating the hydride impregnated support in hydrogen at a temperature range from about 200° C. to about 600° C.

2. The process of claim 1 wherein the metal impregnated support is calcined at about 500° C.–950° C. and the hydride impregnated support is heated in hydrogen at about 250° C.–550° C.

3. The process of claim 2 wherein the impregnated support is heated in hydrogen at about 300° C.–500° C.

4. The process of claims 1, 2 or 3 wherein the support is silica.

5. The process of claims 1, 2 or 3 wherein the calcination is carried out in a neutral or oxidizing atmosphere.

6. The process of claims 1, 2 or 3 wherein the calcination is carried out in air.

7. The process of claims 1, 2 or 3 wherein the transition metal ranges from about 0.1 to about 20 percent by weight (measured as the metal) of the total catalyst and the aluminum added as aluminum hydride ranges from about 0.1 to about 25 percent by weight (measured as the metal) of the total catalyst.

8. The process of claims 1, 2 or 3 wherein the transition metal ranges from about 0.5 to about 5 percent by weight (measured as the metal) of the total catalyst and the aluminum added as aluminum hydride ranges from about 1 to about 10 percent by weight (measured as the metal) of the total catalyst.

9. A catalyst suitable for polymerization reactions prepared by:
(a) impregnating a silica or alumina support with a transition metal salt decomposable upon calcination to the oxide wherein said metal salt is selected from the group consisting of vanadium, titanium, chromium or mixtures thereof;

(b) calcining the metal impregnated support at a temperature ranging from about 450° C. to about 1000° C.;

(c) impregnating the calcined support with a solution of aluminum hydride; and (d) heating the hydride impregnated support in hydrogen at a temperature ranging from about 200° C. to about 600° C.

10. The catalyst of claim 9 wherein the metal impregnated support is calcined at about 500° C.–950° C. and the hydride impregnated support is heated in hydrogen at about 250° C.–550° C.

11. The catalyst of claim 10 wherein the impregnated support is heated in hydrogen at about 300° C.–500° C.

12. The catalyst of claims 9, 10 or 11 wherein the support is silica.

13. The catalyst of claims 9, 10 or 11 wherein the calcination is carried out in a neutral or oxidizing atmosphere.

14. The catalyst of claims 9, 10 or 11 wherein the calcination is carried out in air.

15. The catalyst of claims 9, 10 or 11 wherein the transition metal ranges from about 0.1 to about 20 percent by weight (measured as the metal) of the total catalyst and the aluminum added as aluminum hydride ranges from about 0.1 to about 25 percent by weight (measured as the metal) of the total catalyst.

16. The catalyst of claims 9, 10 or 11 wherein the transition metal ranges from about 0.5 to about 5 percent by weight (measured as the metal) of the total catalyst and the aluminum added as aluminum hydride ranges from about 1 to about 10 percent by weight (measured as the metal) of the total catalyst.

* * * * *